United States Patent
Depta et al.

(10) Patent No.: US 12,234,027 B2
(45) Date of Patent: Feb. 25, 2025

(54) AIRCRAFT BEACON LIGHT, AIRCRAFT WITH AN AIRCRAFT BEACON LIGHT AND METHOD OF OPERATING AN AIRCRAFT BEACON LIGHT

(71) Applicant: Goodrich Lighting Systems GmbH & Co. KG, Lippstadt (DE)

(72) Inventors: Marion Depta, Lippstadt (DE); Anil Kumar Jha, Lippstadt (DE); Andre Hessling-Von Heimendahl, Koblenz (DE); Jens Leuschner, Möhnesee (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/469,602

(22) Filed: Sep. 19, 2023

(65) Prior Publication Data
US 2024/0092502 A1   Mar. 21, 2024

(30) Foreign Application Priority Data
Sep. 19, 2022 (EP) .................................... 22196328

(51) Int. Cl.
*B64D 47/06* (2006.01)
*B64D 45/00* (2006.01)
(Continued)

(52) U.S. Cl.
CPC ............ *B64D 47/06* (2013.01); *B64D 45/00* (2013.01); *F21V 3/00* (2013.01);
(Continued)

(58) Field of Classification Search
CPC .. B64D 47/06; B64D 2203/00; F21Y 2107/30
See application file for complete search history.

(56) References Cited

U.S. PATENT DOCUMENTS 11,006,500 B1  5/2021  Edquist et al.
2006/0007012 A1*  1/2006  Machi ................. H05B 47/235
                                                 340/815.45
(Continued)

FOREIGN PATENT DOCUMENTS

EP  3284684 A1  2/2018
EP  4063278 A1  9/2022
(Continued)

OTHER PUBLICATIONS

Extended European Search Report for Application No. 22196328.3, Feb. 17, 2023, 7 pages.
(Continued)

*Primary Examiner* — Alexander K Garlen
(74) *Attorney, Agent, or Firm* — CANTOR COLBURN LLP

(57) ABSTRACT

An aircraft beacon light includes a plurality of primary light sources for emitting light into at least two spatial sectors, wherein the at least two spatial sectors include a forward sector and at least one of an aft sector, a starboard lateral sector, and a portside lateral sector; and a light transmissive cover, which covers the plurality of primary light sources. The plurality of primary light sources are arranged and configured for providing an FAR-compliant aircraft beacon light output of the aircraft beacon light, in case of the light transmissive cover being in a non-eroded state. The aircraft beacon light also includes at least one booster light source for selectively emitting a booster light output into the forward sector. The at least one booster light source is controllable independently of the plurality of primary light sources.

16 Claims, 6 Drawing Sheets

(51) Int. Cl.
*F21V 3/00* (2015.01)
*F21Y 115/10* (2016.01)

(52) U.S. Cl.
CPC .... *B64D 2045/009* (2013.01); *B64D 2203/00* (2013.01); *F21Y 2115/10* (2016.08)

(56) References Cited

U.S. PATENT DOCUMENTS

| | | | | |
|---|---|---|---|---|
| 2007/0002572 A1* | 1/2007 | Ewig | F21V 7/06 | 362/240 |
| 2011/0121734 A1* | 5/2011 | Pape | B64F 1/20 | 315/86 |
| 2011/0305014 A1* | 12/2011 | Peck | G02B 19/0066 | 29/428 |
| 2016/0280396 A1* | 9/2016 | Schoen | B64D 47/06 | |
| 2019/0144132 A1 | 5/2019 | Jha et al. | | |
| 2021/0262630 A1* | 8/2021 | Jha | F21S 41/125 | |
| 2021/0276730 A1* | 9/2021 | Jha | H05B 47/105 | |

FOREIGN PATENT DOCUMENTS

| | | |
|---|---|---|
| EP | 4082918 A1 | 11/2022 |
| WO | 0241276 A2 | 5/2002 |

OTHER PUBLICATIONS

Title 14—Aeronautics and Space; Chapter I—Federal Aviation Administration, Department of Transportation; Subchapter C—Aircraft; Part 25—Airworthiness Standards: Transport Category Airplanes; Subpart F—Equipment; Lights; S25.1401 Anticollision light system; Sep. 17, 2024 (pp. 1-2).

Title 14—Aeronautics and Space; Chapter I—Federal Aviation Administration, Department of Transportation; Subchapter C—Aircraft; Part 29—Airworthiness Standards: Transport Category Rotorcraft; Subpart F—Equipment; Lights; S29.1401 Anticollision light system; Sep. 17, 2024 (pp. 1-2).

* cited by examiner

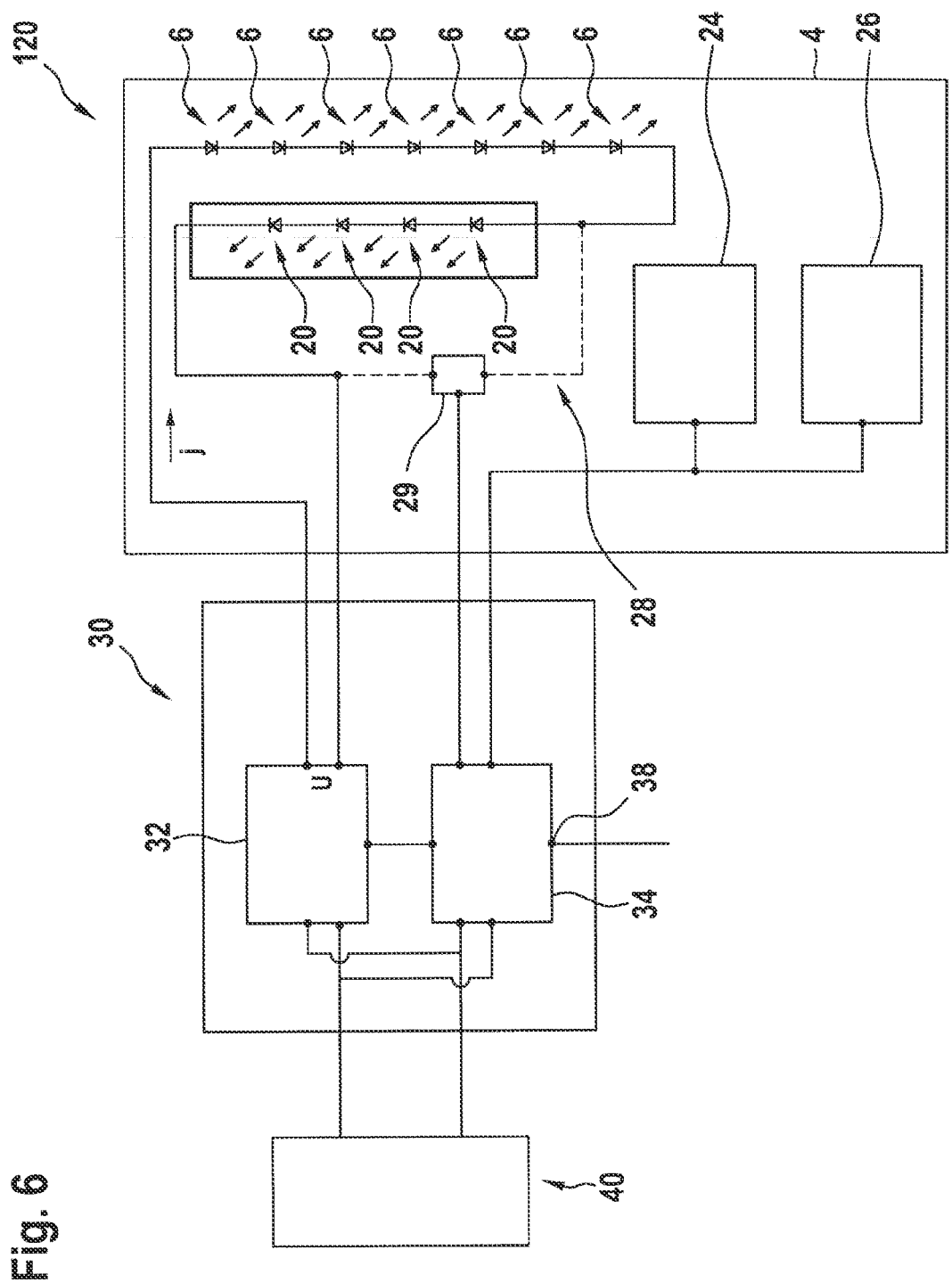

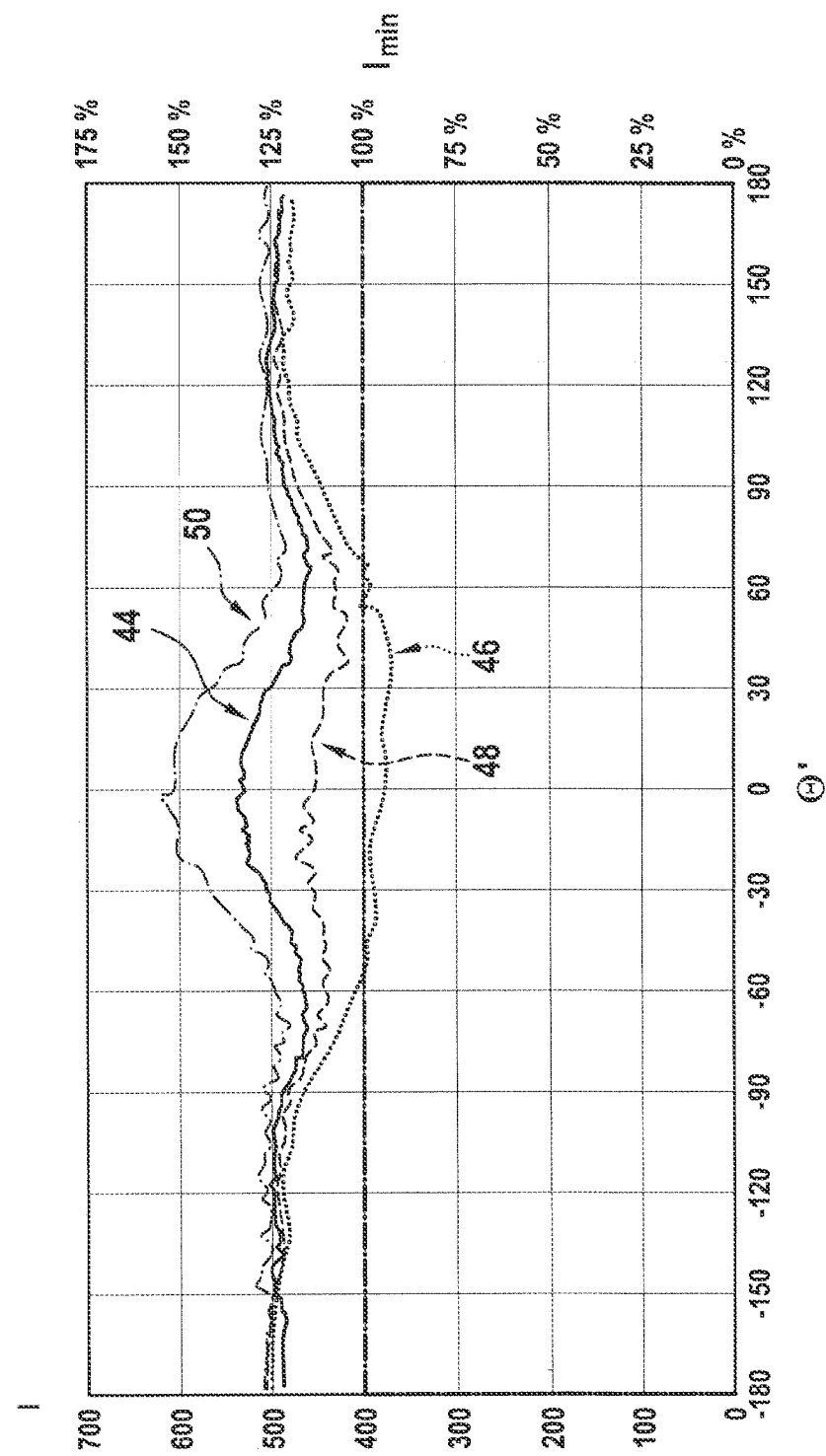

AIRCRAFT BEACON LIGHT, AIRCRAFT WITH AN AIRCRAFT BEACON LIGHT AND METHOD OF OPERATING AN AIRCRAFT BEACON LIGHT

CROSS REFERENCE TO RELATED APPLICATIONS

This application claims priority to European Patent Application No. 22196328.3 filed Sep. 19, 2022, the entire contents of which is incorporated herein by reference.

TECHNICAL FIELD

The present invention is in the field of exterior aircraft lights. The present invention is in particular in the field of aircraft beacon lights.

BACKGROUND

Almost all aircraft are equipped with aircraft lights, including exterior aircraft lights, which are installed on the outside of the aircraft, and interior aircraft lights, which are installed within the aircraft. Exterior aircraft lights may include navigation lights, take-off lights, taxi lights, runway turn-off lights, landing lights, logo lights, cargo loading lights, wing scan lights, engine scan lights, and search lights. Exterior aircraft lights may further include exterior anti-collision lights, which may comprise white strobe anti-collision lights and red-flashing beacon lights.

The exterior anti-collision lights, in particular the red-flashing beacon lights, may be mounted to the fuselage of the aircraft, and they may comprise a light transmissive cover protruding from the fuselage.

When the aircraft is in flight, a portion of said light transmissive cover that is facing forward, i.e., in the direction of flight of the aircraft, is exposed to impinging streams of ambient air. The impinging streams of ambient air may comprise water, moisture and/or particles, such as dust and dirt, which may cause erosion of the light transmissive cover. Said erosion may deteriorate the optical properties of the protective cover, resulting in an inferior light emission of the exterior aircraft light.

Accordingly, it would be beneficial to provide an aircraft beacon light that is capable of handling a deterioration of the light emission due to erosion of the light transmissive cover.

SUMMARY

Exemplary embodiments of the invention include an aircraft beacon light that comprises a plurality of primary light sources for emitting light into at least two spatial sectors, wherein the at least two spatial sectors include a forward sector, and at least one of an aft sector, a starboard lateral sector, and a portside lateral sector. The forward sector may extend basically in and around a forward direction. The forward direction may coincide with the direction of flight and is therefore in the following also referred to as forward flight direction. The aft sector may extend basically in and around a rearward direction, which is oriented opposite to the forward flight direction. The starboard lateral sector and the portside lateral sector may extend laterally, in particular in and around lateral directions that are substantially orthogonal to the forward flight direction.

The aircraft beacon light further comprises a light transmissive cover, which covers the plurality of primary light sources.

The plurality of primary light sources are arranged and configured for providing an aircraft beacon light output that complies with the Federal Aviation Regulations (FAR), in case of the light transmissive cover being in a non-eroded state. The FAR requirements for airplane anti-collision light systems and, therefore, for air plane beacon light systems are defined in Section 25.1401 of the FAR (cf. Document No. 5066, 29 FR 18291, Dec. 24, 1964, as amended by Amendment 25-27, 36 FR 12972, Jul. 10, 1971; Amendment 25-41, 42 FR 36970, Jul. 18, 1977) (see e.g.: https://www.risingup.com/fars/info/part25-1401-FAR.shtml, https://www.law.comell.edu/cfr/text/14/25.1401). The FAR require in particular the following minimum effective illumination intensities at different angles $\beta'$ above and below the horizontal plane, wherein the horizontal plane corresponds to an angle of $\beta'=0°$:

| $\beta'$ | $I_{min}$ |
| --- | --- |
| 0°-5° | 400 cd |
| 5°-10° | 240 cd |
| 10°-20° | 80 cd |
| 20°-30° | 40 cd |
| 30°-75° | 20 cd |

FAR Section 29.1401 contains different, but similarly structured requirements for rotorcraft anti-collision lights and, therefore, for rotorcraft beacon lights (cf. Section 29.1401 of the FAR; Document No. 5084, 29 FR 16150, Dec. 3, 1964, as amended by Amendment 29-7, 36 FR 12972, Jul. 10, 1971; Amendment 29-11, 41 FR 5290, Feb. 5, 1976; https://www.risingup.com/fars/info/part29-1401-FAR.shtml, https://www.law.cornell.edu/cfr/text/14/29.1401).

The term FAR-compliant aircraft beacon light output is used herein to denote an aircraft beacon light output that fulfils the FAR requirements, as laid out above, for the spatial sectors in question, i.e. for the forward sector and at least one of the aft sector, the starboard lateral sector, and the portside lateral sector, in at least one hemisphere, i.e. at least above or below the horizontal plane.

The aircraft beacon light may comprise a plurality of light sources for emitting light into all of the forward sector, the aft sector, the starboard lateral sector, and the portside lateral sector. The aircraft beacon light may provide for a 360° aircraft beacon light output around the aircraft beacon light, i.e. it may provide for a 360° aircraft beacon light output in the horizontal plane.

According to exemplary embodiments of the invention, the aircraft beacon light further comprises at least one booster light source for selectively emitting a booster light output into the forward sector. When activated, the booster light output increases the emission of light into the forward sector, in order to make up for a reduction of the effective luminous intensity that is caused by erosion of the light transmissive cover. The booster light output may increase the emission of light into the forward sector, so that the total emission of light, as it is provided by the primary light sources in combination with the at least one booster light sources, exceeds the minimum requirements according to the FAR, even if the light transmissive cover, in particular a forward facing portion ("front side") of the light transmissive cover, is eroded.

In an aircraft beacon light according to an exemplary embodiment of the invention, the at least one booster light source is controllable independently of the plurality of primary light sources. In this way, the at least one booster light source may be selectively activated in addition to the primary light sources. In case the emission of light of the aircraft beacon light into the forward sector is deteriorated by erosion of the light transmissive cover, in particular by erosion of the forward facing portion of the light transmissive cover, the at least one booster light source may be activated for increasing the emission of light of the aircraft beacon light into the forward sector, in order to fulfill the minimum requirements as defined by the FAR.

Each of the at least one booster light source may be arranged to emit all or at least some of its light into the forward sector. In other words, the aircraft beacon light may be free of booster light source(s) that emit their light into the aft sector and/or the starboard lateral sector and/or the portside lateral sector only.

Exemplary embodiments of the invention also include an aircraft, in particular an airplane or a helicopter, that comprises at least one aircraft beacon light according to an exemplary embodiment of the invention. The aircraft may in particular comprise an upper aircraft beacon light according to an exemplary embodiment of the invention, which is mounted to a top portion ("roof") of a fuselage of the aircraft or to a vertical stabilizer of the aircraft. The aircraft may also comprise a lower aircraft beacon light according to an exemplary embodiment of the invention, which is mounted to a bottom portion ("belly") of the fuselage of the aircraft.

Exemplary embodiments of the invention further include a method of operating an aircraft beacon light, which comprises a plurality of primary light sources, at least one booster light source, and a light transmissive cover, which covers the plurality of primary light sources, wherein the method comprises: operating the plurality of primary light sources for emitting an aircraft beacon light output, which is FAR-compliant in case of the light transmissive cover being in a non-eroded state, into at least two spatial sectors, wherein the at least two spatial sectors include a forward sector and at least one of an aft sector, a starboard lateral sector, and a portside lateral sector; and wherein the method further comprises, based on a state of erosion of the light transmissive cover, selectively emitting a booster light output into the forward sector with the at least one booster light source.

Selectively emitting a booster light output based on the state of erosion of the light transmissive cover may in particular include emitting a booster light output if the state of erosion of the light transmissive cover exceeds a pre-defined level of erosion.

An aircraft beacon light according to exemplary embodiments of the invention and a method of operating an aircraft beacon light according to exemplary embodiments of the invention may allow for providing an FAR-compliant aircraft beacon light output by activating the at least one booster light source in addition to the plurality of primary light sources if the emission of light by the aircraft beacon light is deteriorated due to erosion of the light transmissive cover. In consequence, an aircraft beacon light according to an exemplary embodiment of the invention may still be used and considered airworthy in an aircraft even if a portion of the light transmissive cover, in particular a front portion of the light transmissive cover facing into the forward flight direction, is eroded to such a large extent that operating the primary light sources alone, i.e. without additionally operating the at least one booster light source, would not provide the light output that is necessary for fulfilling the minimum requirements defined by the FAR. As a result, the lifetime of the aircraft beacon light and, in particular, the time period of use of the light transmissive cover may be extended and the maintenance intervals may be prolonged. In consequence, the costs for maintaining an aircraft, comprising at least one aircraft beacon light according to an exemplary embodiment of the invention, may be reduced.

The aircraft beacon light is a red-flashing aircraft beacon light. In an embodiment, the aircraft beacon light is a combined red-flashing beacon light and white strobe anti-collision light. In addition/alternatively, the aircraft beacon light may be capable of emitting infrared light flashes, e.g. for covert operations.

In an embodiment, the aircraft beacon light is a fuselage-mounted aircraft beacon light.

In an embodiment, the light transmissive cover covers/is arranged over the plurality of primary light sources as well as the at least one booster light source. In other words, the aircraft beacon light may comprise a single light transmissive cover, which covers both, the plurality of primary light sources as well as the at least one booster light source. Providing the aircraft beacon light with only a single light transmissive cover may lead to a comparably simple structure of the aircraft beacon light. Such an implementation may be produced at comparably low cost. Also, the single light transmissive cover may be replaced in a comparably straightforward manner.

In an embodiment, the at least one booster light source comprises a plurality of booster light sources. Employing a plurality of booster light sources may allow for enhancing the additional light output that is emitted by the booster light sources. In consequence, a more severe level of erosion of the light transmissive cover may be compensated for by the additional light output that is provided by the booster light sources.

In an embodiment, the plurality of booster light sources are individually controllable, i.e. each of the plurality of booster light sources may be activated and deactivated individually. Booster light sources that are individually controllable may allow for adjusting the light output that is emitted by the booster light sources in a highly granular manner.

In an embodiment, the plurality of booster light sources are collectively controllable, i.e. the plurality of booster light sources may be activated and deactivated only collectively. Booster light sources that are collectively controllable may allow for reducing the complexity of controlling the operation of the booster light sources, as compared to a configuration that allows for individually controlling the individual light sources.

In an embodiment, the plurality of primary light sources have a light source arrangement along a closed contour, and the at least one booster light source is integrated into said light source arrangement along the closed contour. In an embodiment, in which the aircraft beacon light comprises a plurality of booster light sources, at least some or all of the booster light sources may be integrated into said light source arrangement along the closed contour. Integrating the at least one booster light source into the light source arrangement may allow for a compact, space-saving geometry of the aircraft beacon light.

In an embodiment, the plurality of primary light sources have a light source arrangement along a closed contour, and the at least one booster light source is arranged separately from said light source arrangement along the closed contour. In an embodiment, in which the aircraft beacon light comprises a plurality of booster light sources, at least some or all of the booster light sources may be arranged separately from said light source arrangement along the closed contour. Arranging the at least one booster light source separately from said light source arrangement may allow for a more flexible arrangement of the at least one booster light source. It may in particular allow for adding at least one booster light source to the light source arrangement, even in case there is no free space between the plurality of primary light sources of the light source arrangement for integrating the at least one booster light source into said light source arrangement extending along the closed contour.

The at least one booster light source that is arranged separately from said light source arrangement, extending along the closed contour, may be arranged spaced apart from the plurality of primary light sources. The at least one booster light source may in particular be arranged outside of or inside of the closed contour of the light source arrangement of the plurality of primary light sources.

In an embodiment, the closed contour extends along a circle or along an ellipse.

In an embodiment, the closed contour extends along a polygon, such as a rectangle, in particular a square, or a hexagon, or an octagon.

In an embodiment, an opening angle of the light output may be defined as that angular range where the effective luminous intensity exceeds a predefined value, for example an effective luminous intensity of 20 cd. Horizontal opening angles may be defined for the forward sector, the starboard lateral sector, the portside lateral sector, and the aft sector, and may be defined as those angular ranges that experience illumination when operating the primary light sources associated with the forward sector, the starboard lateral sector, the portside lateral sector, and the aft sector, respectively. Vertical opening angles may be defined in various vertical planes around the aircraft beacon light, when operating the primary light sources associated with all of the forward sector, the starboard lateral sector, the portside lateral sector, and the aft sector.

In an embodiment, the vertical opening angle, i.e. the opening angle in a vertical plane, of the aircraft beacon light output that is output into the starboard lateral sector and/or into the portside lateral sector may be larger than the vertical opening angle of the aircraft beacon light output that is output into the forward sector. The vertical opening angle of the aircraft beacon light output that is output into the starboard lateral sector and into the portside lateral sector may be larger than vertical opening angle of the aircraft beacon light output that is output into the forward sector, in order to overcome a visual blockage of the light output that is output into the starboard lateral sector and into the portside lateral sector. Such a visual blockage of the light output may in particular be caused by the engines of the aircraft and/or by winglets, which are formed at the wings of the aircraft.

In an embodiment, a spatial density of the primary light sources that are arranged along the closed contour for emitting light into the forward sector is smaller than a spatial density of the primary light sources that are arranged along the closed contour for emitting light into the aft sector, the starboard lateral sector and/or the portside lateral sector. Arranging the primary light sources, which are responsible for emitting light into the forward sector, at a lower spatial density than the primary light sources, which are responsible for emitting light into the aft sector, the starboard lateral sector and/or the portside later sector, may be a particularly elegant way of making the vertical opening angle of the aircraft beacon light output that is output into the forward sector smaller than the vertical opening angle of the aircraft beacon light output that is output into the aft sector, the starboard lateral sector and/or the portside lateral sector.

In an embodiment, the smaller spatial density of the primary light sources that are arranged along the closed contour for emitting light into the forward sector results in at least one gap that is formed between at least some of the neighboring primary light sources that are arranged for emitting light into the forward sector. In such an embodiment, the at least one booster light source may be arranged in said at least one gap.

By arranging the at least one booster light source in at least one gap that is formed between at least some of the neighboring primary light sources, the at least one booster light source may be integrated into the light source arrangement of the primary light sources particularly well. This may allow for a very compact arrangement of the primary light sources and the at least one booster light source.

In an embodiment, the plurality of primary light sources and the at least one booster light source are electrically connected in series. In other words, the plurality of primary light sources and the at least one booster light source are arranged electrically in a series connection. When the plurality of primary light sources and the at least one booster light source are arranged electrically in a series connection, a common electric current may be sent through the plurality of primary light sources and the at least one booster light source. The common electric current may be supplied by an electric power supply that is configured for providing a predefined electric current. Arranging the light sources in a series connection may simplify the installation, the electric wiring, and the operation of the plurality of light sources, including the primary light sources and the at least one booster light source.

In an embodiment, the aircraft beacon light comprises a switchable bypass circuit. The switchable bypass circuit may comprise an electric current path that is connected parallel to the at least one booster light source. The switchable bypass circuit may allow for selectively deactivating the at least one booster light source by electrically bypassing the at least one booster light source. A switchable bypass circuit may allow for conveniently activating and deactivating the at least one booster light source in an electric configuration, in which the plurality of primary light sources and the at least one booster light source are arranged electrically in a series connection.

In a method of operating an aircraft beacon light according to an exemplary embodiment of the invention, the switching of the at least one booster light source may be independent of the switching the plurality of primary light sources. In other words, in such a configuration, activating and deactivating the at least one booster light source does not affect the operation of the plurality of primary light sources.

The switching of the at least one booster light source may in particular include selectively bypassing the at least one booster light source by activating an electric bypass circuit.

In an embodiment, the plurality of primary light sources are a plurality of primary LEDs, in particular a plurality of primary LEDs that emit red light. In an embodiment, the at least one booster light source is at least one booster LED, in particular at least one booster LED that emits red light. LEDs are highly efficient and durable light sources and may be provided at low costs.

In an embodiment, the plurality of primary light sources and/or the at least one booster light source comprise at least one white light source, in particular at least one LED emitting white light. An aircraft beacon light that comprises a plurality of light sources that emit red light and at least one light source that emits white light may be employed as combined red-flashing beacon and white strobe anti-collision light.

In an embodiment, the plurality of primary light sources and/or the at least one booster light source comprise at least one light source that is configured for emitted infrared light. A light source that emits infrared light may be activated in a covert mode, which may in particular be beneficial in a military context.

In an embodiment, the aircraft beacon light further comprises an erosion detector. The erosion detector may be configured for determining a state of erosion of the light transmissive cover, in particular a state of erosion of a forward facing portion of the light transmissive cover.

In an embodiment, the aircraft beacon light further comprises a controller. The controller may be configured for activating and deactivating the at least one booster light source depending on the state of erosion of the light transmissive cover. In particular, the controller may be configured for activating and deactivating the at least one booster light source depending on the state of erosion of the light transmissive cover, as it has been detected by the erosion detector. The controller may in particular be configured for deactivating the booster light sources, when the detected erosion does not exceed a predefined threshold.

In an exemplary embodiment of the invention, the method of operating an aircraft beacon light includes detecting the state of erosion of the light transmissive cover, in particular detecting a state of erosion of a forward facing portion of the light transmissive cover, with the erosion detector. The method may include activating the at least one booster light source for emitting a booster light output into the forward sector depending on the state of erosion of the light transmissive cover, as it has been detected by the erosion detector. The method may in particular include activating the at least one booster light source when the detected erosion exceeds a predefined threshold.

Detecting the erosion of the light transmissive cover with an erosion detector may allow for efficiently controlling the operation of the at least one booster light source, depending on the current state of erosion of the light transmissive cover. In consequence, unnecessary operation of the at least one booster light source may be avoided, when the erosion of the light transmissive cover is low, and the at least one booster light source may be automatically activated, when its operation is indicated for enhancing the light output emitted into the forward sector due to an increased erosion of the light transmissive cover.

In an embodiment, the forward sector extends in a horizontal angular range of at least ±30° around the forward flight direction, in particular in a horizontal angular range of ±45° around the forward flight direction. In an embodiment, the booster functionality of the at least one booster light source affects a horizontal angular range of ±30°, in particular a horizontal angular range of ±45°, around the forward flight direction. A horizontal angular range of between ±30° and ±45° around the forward flight direction may be particularly prone to erosion caused by impinging streams of ambient air, when the aircraft is in flight. Thus, enhancing the emission of light that is emitted by the aircraft beacon light in a horizontal angular range of at least ±30°, in particular a horizontal angular range of ±45°, may lead to an efficient compensation of the reduction of light emission due to erosion that is caused by impinging streams of ambient air.

BRIEF DESCRIPTION OF THE DRAWINGS

Further exemplary embodiments of the invention are described below with respect to the accompanying drawings, wherein:

FIG. 6 shows a functional block diagram of an aircraft beacon light and a controller for controlling the operation of the aircraft beacon light according to an exemplary embodiment of the invention; and FIG. 7 depicts a diagram showing a plurality of effective luminous intensity distributions, which are provided by an aircraft beacon light according to an exemplary embodiment of the invention, in a horizontal plane in different modes of operation and at different states of erosion of the light transmissive cover.

DETAILED DESCRIPTION

Figure 1:
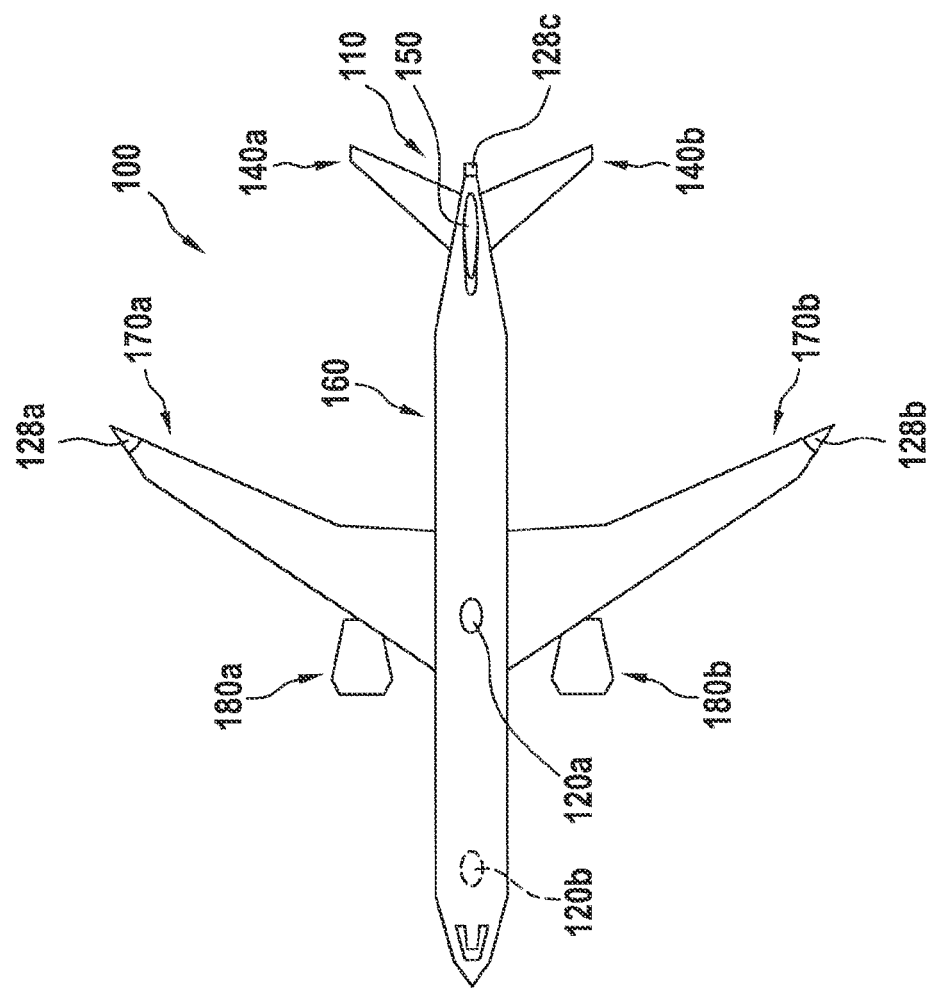
FIG. 1 shows a schematic top view of an aircraft, which is equipped with an exterior aircraft anti-collision light system according to an exemplary embodiment of the invention.
Figure 2:
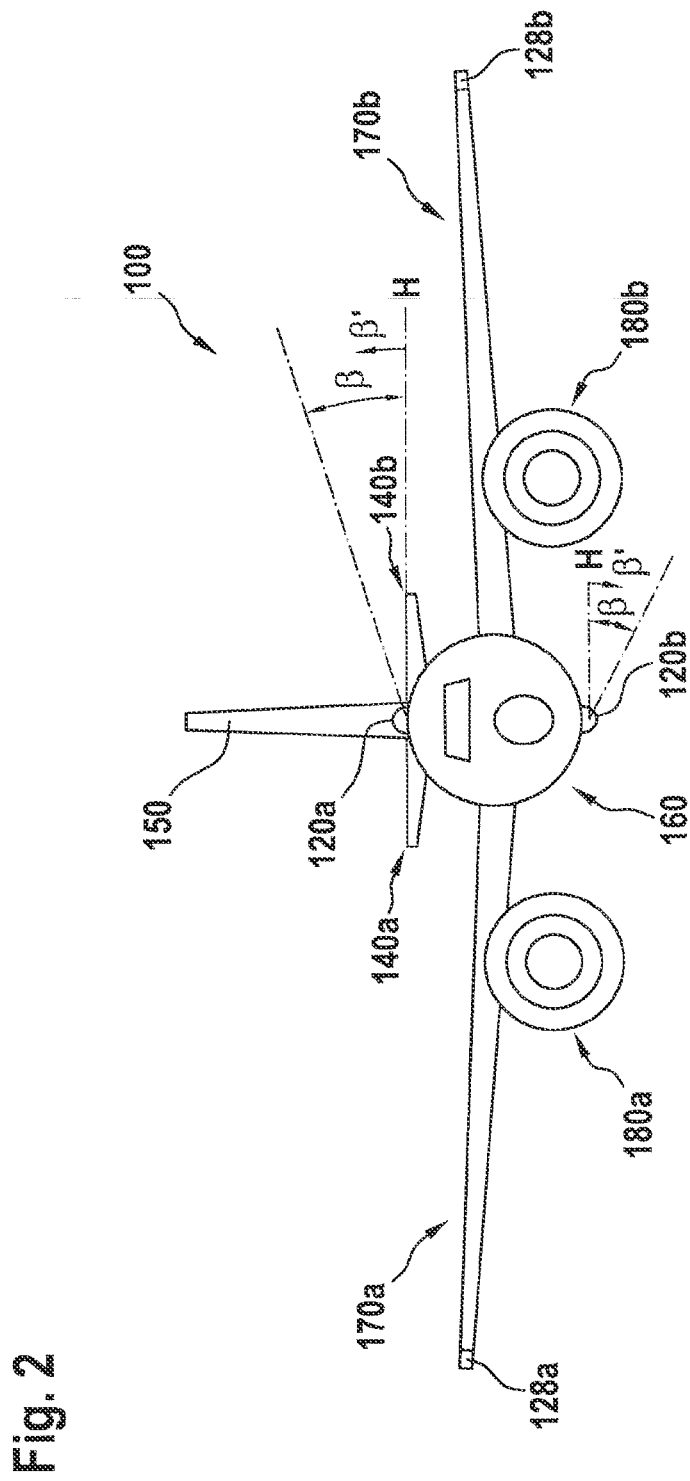
FIG. 2 shows a schematic front view of the aircraft shown in FIG. 1.

FIG. 1 shows a schematic top view of an aircraft 100, in particular of a passenger air plane 100, from a position above the aircraft 100. FIG. 2 shows a schematic front view of the aircraft 100 depicted in FIG. 1.

The aircraft 100 comprises a fuselage 160 and two wings 170a, 170b extending laterally from the fuselage 160. A respective engine 180a, 180b is attached to each of the wings 170a, 170b.

The aircraft 100 further comprises two horizontal stabilizers 140a, 140b and a vertical stabilizer 150, which are mounted to an aft section of the fuselage 160.

The aircraft 100 is equipped with a variety of exterior aircraft lights.

Out of all the exterior aircraft lights, which may be provided at the exterior of an aircraft 100, only white strobe anti-collision lights 128a, 128b, and 128c and red-flashing beacon lights 120a, 120b are depicted in FIGS. 1 and 2.

The aircraft 100 may be equipped with additional exterior lights, which may in particular include at least one of navigation lights, logo lights, wing scan lights, engine scan lights, runway turnoff lights, cargo loading lights, landing lights, and/or take-off lights. For clarity and simplicity of the illustration and the following description, all these additional types of exterior lights are not depicted in FIGS. 1 and 2.

The aircraft 100 shown in FIGS. 1 and 2 is equipped with an upper red-flashing beacon light 120a, which is installed in an upper portion of the aircraft 100, in particular on top of the fuselage 160. In an alternative configuration, the upper red-flashing beacon light 120a may be installed in an upper portion of the vertical stabilizer 150, in particular on top of the vertical stabilizer 150.

The aircraft 100 further comprises a lower red-flashing beacon light 120b, which is installed in a lower portion of the aircraft 100. The lower red-flashing beacon light 120b may in particular be mounted to the bottom of the fuselage 160.

Although only one lower red-flashing beacon light 120b is depicted in FIGS. 1 and 2, the aircraft 100 may comprise two or more lower red-flashing beacon lights 120b, which may be installed at different positions along the longitudinal extension of the fuselage 160. A first lower red-flashing beacon light may, for example, be mounted to a middle portion of the fuselage 160, close to the main gear (not shown) of the aircraft 100, and a second lower red-flashing beacon light may, for example, be mounted to an aft portion of the fuselage below the horizontal and vertical stabilizers 140a, 140b, 150.

In alternative configurations, red-flashing beacon lights may be installed at the tips of the wings 170a, 170b and at the tail 110 of the aircraft 100, potentially supplemented by red-flashing beacon lights on the side walls of the fuselage 160 and/or on the bottom of the fuselage 160.

Commonly, the red-flashing beacon lights 120a, 120b are switched on when the engines 180a, 180b are started, such that the emitted sequences of light flashes may help to inform and warn ground personnel in the vicinity of the aircraft 100 that the engines 180a, 180b have been started.

The output of the red-flashing beacon lights 120a, 120b is perceived as a sequence of red light flashes in a given viewing direction. The red-flashing beacon lights 120a, 120b commonly flash with a flash frequency fflash in the range of between 40 and 100 flashes per minute, in particular with a flash frequency fflash in the range of between 50 and 70 flashes per minute, more particularly with a flash frequency fflash of 60 flashes per minute. The red-flashing beacon lights 120a, 120b are synchronized, in order to flash simultaneously.

The aircraft 100 depicted in FIGS. 1 and 2 is further equipped with at least three white strobe anti-collision lights 128a, 128b, and 128c.

First and second white strobe anti-collision lights 128a, 128b are installed in the wings 170a, 170b, in particular in the respective tips of the wings 170a, 170b. A third white strobe anti-collision light 128c is installed at the tail 110 of the aircraft 100.

The white strobe anti-collision lights 128a-128c emit respective sequences of white light flashes during normal, in-flight operation of the aircraft 100. It is also possible that the white strobe anti-collision lights 128a-128c are only operated during the night and in bad weather conditions.

The white strobe anti-collision lights 128a-128c commonly flash with a flash frequency fflash in the range of between 40 and 100 flashes per minute, in particular with a flash frequency fflash in the range of between 50 and 70 flashes per minute, more particularly with a flash frequency fflash of 60 flashes per minute.

The white strobe anti-collision lights 128a-128c are synchronized for flashing simultaneously. Additionally, the flashes of the white strobe anti-collision lights 128a-128c are offset with respect to the flashes of the red-flashing beacon lights 120a, 120b, i.e. the white strobe anti-collision lights 128a-128c flash in between the flashes of the red-flashing beacon lights 120a, 120b, and vice versa.

The flashes of the white strobe anti-collision lights 128a-128c and the flashes of the red-flashing beacon lights 120a, 120b may have a pulse length in the range of between 150 ms and 250 ms, in particular a pulse length in the range of between 180 ms and 220 ms, more particularly a pulse length of 200 ms.

Figure 3:
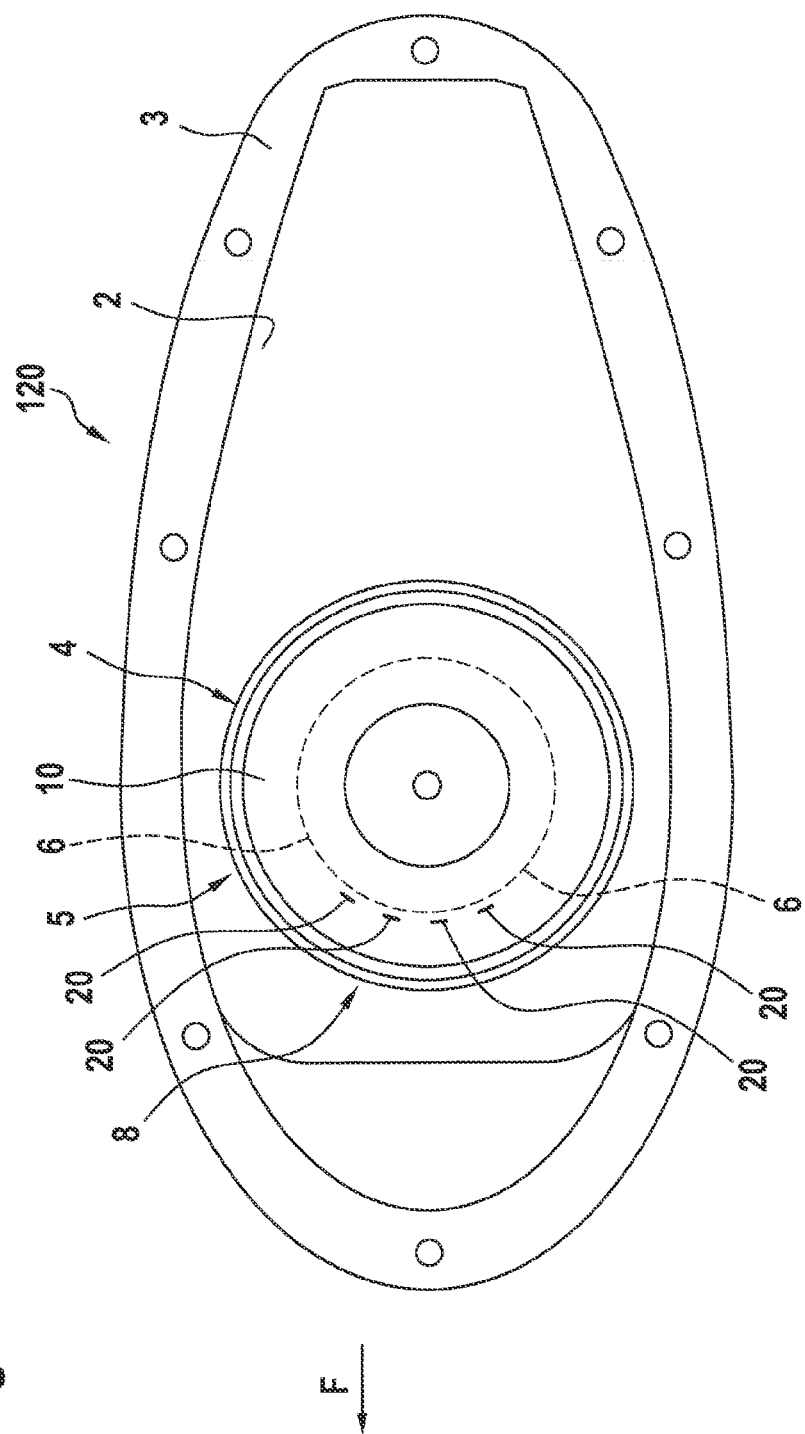
FIG. 3 shows a schematic top view of an aircraft beacon light according to an exemplary embodiment of the invention.

FIG. 3 shows a top view of a red-flashing beacon light 120 according to an exemplary embodiment of the invention.

The aircraft beacon light 120 comprises a base portion 2 with a peripheral mounting portion 3. The peripheral mounting portion 3 extends along the outer periphery of the base portion 2 and is configured to be mounted to the fuselage 160 of the aircraft 100, in particular to an outer skin of the fuselage 160 of the aircraft 100.

The peripheral mounting portion 3 depicted in FIG. 3 is only exemplary. Alternative embodiments of aircraft beacon lights 120, which are not explicitly depicted in the Figures, may comprise other types of mounting portions, which do not necessarily extend along the outer periphery of the aircraft beacon light 120.

The aircraft beacon light 120 further comprises a light emission portion 5. The light emission portion 5 comprises a plurality of light sources 6, 20, which are supported by a light source support 10, for example by a printed circuit board. The light emission portion 5 further comprises a light transmissive cover 4 covering the plurality of light sources 6, 20 and the light source support 10. One or more optical elements, such as one or more reflectors and/or one or more lenses and/or one or more shutters, may be arranged between the light source support 10 and the light transmissive cover 4 for shaping the beacon light output from the light, emitted by the plurality of light sources 6, 20.

When the aircraft beacon light 120 is mounted to the fuselage 160 of an aircraft 100, as it is depicted in FIGS. 1 and 2, a forward facing portion ("front side") 8 of the light transmissive cover 4, which is shown on the left side in FIG. 3, is facing into the forward flight direction F of the aircraft 100. In consequence, the front side 8 of the light transmissive cover 4 is exposed to impinging streams of ambient air, when the aircraft 100 is in flight. As a result, the front side 8 of the light transmissive cover 4 is prone to erosion, which is caused by the impinging streams of ambient air.

Figure 4:
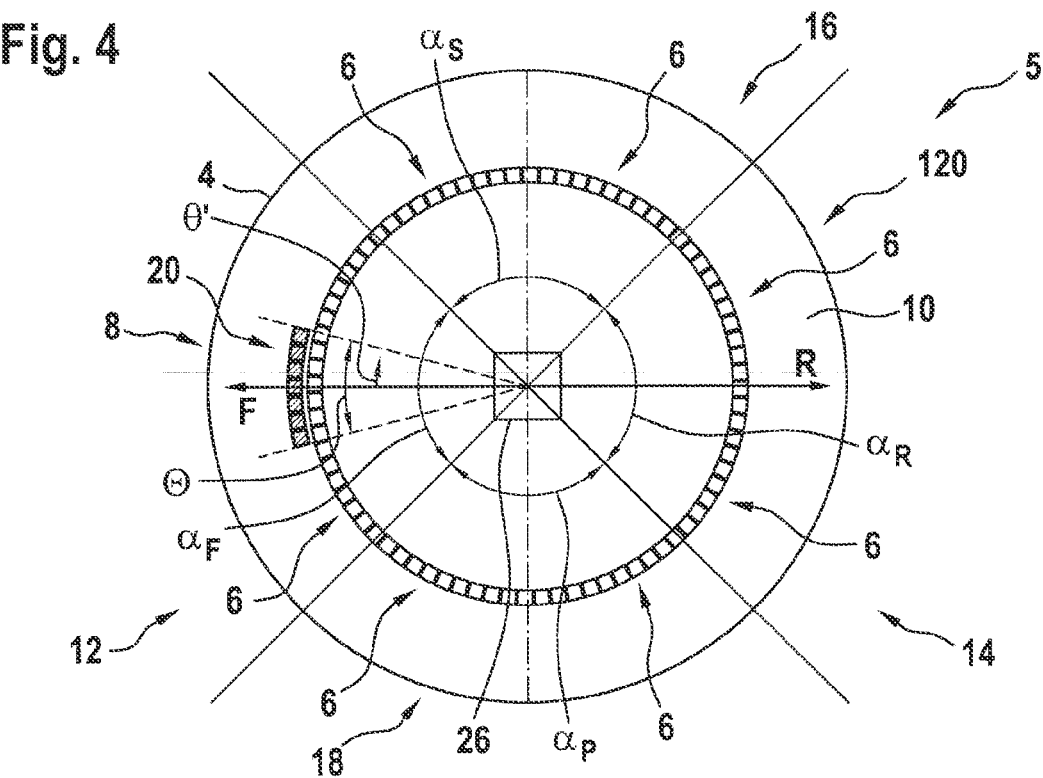
FIG. 4 shows a schematic top view of selected components of an aircraft beacon light according to an exemplary embodiment of the invention.

FIG. 4 shows an enlarged schematic top view of the light emission portion 5 of the aircraft beacon light 120 shown in FIG. 3.

The light emission portion 5 comprises the light source support 10 and a plurality of light sources 6, 20. The plurality of light sources 6, 20 are mounted to and supported by the light source support 10. Electric connectors, for example electric connection paths, which are not depicted in FIG. 4, may be formed on the light source support 10 for electrically connecting the plurality of light sources 6, 20 to an electric power supply, which is not shown in FIG. 4.

The light sources 6, 20 may include LEDs, in particular LEDs that are configured for emitting red light.

Each of the light sources 6, 20 may further include an optical element (not shown), such as a lens and/or a reflector, for forming the light output that is emitted by the respective light source 6, 20.

The plurality of light sources 6, 20 include a plurality of primary light sources 6, which are arranged along a closed contour, in particular along a circle, and which are configured for emitting light radially outwards from said circle. In the depicted configuration, where the plurality of light sources 6, 20 are arranged on the light source support 10 with their main light emission directions being substantially orthogonal to the light source support 10, a lens structure and/or a reflector structure may be arranged over the plurality of light sources 6, 20 to re-direct at least a portion of the light radially outwards. The lens structure may be an annular lens structure, in particular an annular lens structure that is overmolded over the circular arrangement of light sources. It is also possible that an annular reflector structure or a reflector structure having various reflector sections is arranged to the inside of and reaching over the plurality of light sources 6, 20. The re-directing of light from the circular arrangement of light sources for achieving an FAR-compliant beacon light output is per se known.

The plurality of primary light sources 6 may in particular be configured for emitting light into four spatial sectors 12, 14, 16, and 18. The four spatial sectors may include a forward sector 12 extending basically forward, i.e. in the forward flight direction F, and an aft sector 14 extending basically rearward, i.e. opposite to the forward flight direction F.

The four spatial sectors may further include two lateral sectors 16, 18 extending laterally, in particular basically orthogonal to the forward flight direction F. The two lateral sectors 16, 18 may in particular include a starboard lateral sector 16, extending into the starboard direction, and a portside lateral sector 18, extending into the portside direction opposite to the starboard direction.

The four spatial sectors 12, 14, 16, 18 may be jointly defined as that angular range in space, in which the effective luminous intensity Ieff generated by the operation of the primary light sources 6 exceeds a predefined threshold Ith, for example a predefined threshold Ith of 20 cd. The borders between the four spatial sectors 12, 14, 16, 18 may be defined in terms of their angles with respect to the forward flight direction/with respect to the rearward direction.

The forward sector 12 may cover an angular range having an opening angle αF of between 60° (+/−30°) and 90° (+/−45°), centered around the forward flight direction F, in a horizontal plane. The horizontal plane may extend parallel to the light source support 10. The forward sector 12 may further cover an angular range having an opening angle β of between 80° and 100° in a vertical plane. The opening angle β may extend between −5° and +75° with respect to the horizontal plane. The vertical plane is oriented orthogonal to a horizontal reference plane H, as it is for example indicated in FIG. 2.

When the aircraft beacon light 120 is mounted to the top of the fuselage 160, a positive angle with respect to the horizontal plane refers to an angle above the horizontal plane H, and a negative angle with respect to the horizontal plane refers to an angle below the horizontal plane H.

When the aircraft beacon light 120 is mounted to the bottom of the fuselage 160, a positive angle with respect to the horizontal plane refers to an angle below the horizontal plane H, and a negative angle with respect to the horizontal plane refers to an angle above the horizontal plane H.

In the horizontal plane, the aft sector 14 may cover an angular range having an opening angle αR of between 60° (+/−30°) and 90° (+/−45°), centered around the rearward direction R, which is oriented opposite to the forward flight direction F. The aft sector 14 may cover an angular range having an opening angle β of between 80° and 100° in a vertical plane. The opening angle β may extend between −5° and +75° in the vertical plane, which is oriented orthogonal to the horizontal plane.

In the horizontal plane, the starboard lateral sector 16 and the portside lateral sector 18 may cover the angular ranges between the forward sector 12 and the aft sector 14 in the horizontal plane. In other words, the starboard lateral sector 16 and the portside lateral sector 18 may have opening angles αS, αP in the range of between 90° (+/−45° with respect to a lateral direction) and 120° (+/−60° with respect to a lateral direction), respectively. The starboard lateral sector 16 and the portside lateral sector 18 may be centered around lateral directions, which are orthogonal to the forward flight direction F.

In order to overcome a visual blockage, which may be caused by the engines 180a, 180b and/or by winglets (not shown) formed at the wings 170a, 170b of the aircraft 100, the angular range in the vertical plane, as it is covered by the starboard lateral sector 16 and by the portside lateral sector 18, may be larger than the respective angular range that is covered by the forward sector 12 and by the aft sector 14 in the vertical plane. In other words, the vertical opening angles β of the lateral sectors 16, 18 may be larger than the vertical opening angles β of the forward sector 12 and of the aft sector 14, respectively.

The starboard lateral sector 16 and the portside lateral sector 18 may, for example, extend over angular ranges having a respective opening angle β of between 85° and 110° in a vertical plane. The opening angle β may extend between −10° and +75° in the vertical plane, which is oriented orthogonal to the horizontal plane.

The above mentioned opening angles of the spatial sectors 12, 14, 16, 18 are exemplary only. The angular extensions/opening angles of the spatial sectors 12, 14, 16, 18 may be adapted according to the structure of the aircraft 100 and the mounting positions of the aircraft beacon lights, in order to provide an aircraft beacon light output, which complies with the Federal Aviation Regulations (FAR), in case of the light transmissive cover being in a non-eroded state.

The FAR requirements for air plane anti-collision light systems are defined in Section 25.1401 of the Document No. 5066, 29 FR 18291, Dec. 24, 1964, as amended by Amendment 25-27, 36 FR 12972, Jul. 10, 1971; Amendment 25-41, 42 FR 36970, Jul. 18, 1977 (see: https://www.risingup.com/fars/info/part25-1401-FAR.shtml, https://www.law.cornell.edu/cfritext/14/25.1401).

The FAR requires in particular the following minimum effective illumination intensities at different angles β' above and below the horizontal plane, wherein the horizontal plane corresponds to an angle of β'=0°:

| β' | $I_{min}$ |
|---|---|
| 0°-5° | 400 cd |
| 5°-10° | 240 cd |
| 10°-20° | 80 cd |
| 20°-30° | 40 cd |
| 30°-75° | 20 cd |

The plurality of primary light sources 6 are in particular arranged and configured for providing an effective luminous intensity Ieff of at least 400 cd in the horizontal plane (β'=0°) in all four spatial sectors 12, 14, 16, 18.

The aircraft beacon light 120, as depicted in FIG. 4, further comprises a plurality of booster light sources 20. The booster light sources 20 are configured for selectively emitting an additional booster light output into the forward sector 12. The booster light sources 20 may be activated for enhancing the light output, which is emitted into the forward sector 12, in response to a reduction of the effective luminous intensity Ieff, as emitted by the aircraft beacon light 120 due to erosion of the light transmissive cover 4, in particular due to erosion of the front side 8 of the light transmissive cover 4.

Enhancing the light output, as emitted into the forward sector 12, by activating the booster light sources 20 may allow for providing an FAR-compliant aircraft beacon light output of the aircraft beacon light 120, even if the light output of the aircraft beacon light 120 is deteriorated due to erosion of the light transmissive cover 4, in particular due to erosion of the front side 8 of the light transmissive cover 4.

The booster light sources 20 are controllable independently of the plurality of primary light sources 6. The aircraft beacon light 120 may in particular be operated in a normal operation mode, in which the primary light sources 6 are activated and in which the at least one booster light source 20 is deactivated. The normal mode of operation may be chosen when the erosion of the light transmissive cover 4 is so small that it is not necessary to activate the booster light sources 20 for enhancing the light output, provided by the aircraft beacon light 120, in order to fulfill the FAR requirements.

The aircraft beacon light 120 may be operated in a booster operation mode, in which the primary light sources 6 and the at least one booster light source 20 are activated. The booster operation mode may be chosen when the erosion of the light transmissive cover 4 is so large that it is necessary to activate the booster light sources 20 for enhancing the light output, provided by the aircraft beacon light 120, in order to fulfill the FAR requirements.

The erosion of light transmissive cover 4, in particular the erosion of the front side 8 of the light transmissive cover 4, may be monitored by an erosion detector 26. In an embodiment, which comprises an erosion detector 26, the booster light sources 20 may be activated in addition to the primary light sources 6, when the erosion of light transmissive cover 4, in particular the erosion of the front side 8 of the light transmissive cover 4, as it is detected by the erosion detector 26, exceeds a predefined erosion threshold.

Activating the booster light sources 20 only when the erosion of the light transmissive cover 4, in particular the erosion of the front side 8 of the light transmissive cover 4, exceeds a predefined erosion threshold may allow for keeping the energy consumption of the aircraft beacon light 120 low and prolonging the lifetime of the booster light sources 20. In particular, an unnecessary operation of the booster light sources 20 may be prevented, as long as the erosion of light transmissive cover 4 is sufficiently small so that it is not necessary to activate the booster light sources 20 for enhancing the light output provided by the aircraft beacon light 120.

In the embodiment depicted in FIG. 4, the booster light sources 20 are arranged outside the circular closed contour that is formed by the primary light sources 6. The booster light sources 20 are in particular arranged in front of the circular closed contour of primary light sources 6 in the forward flight direction F.

In an alternative configuration, which is not explicitly illustrated in the figures, the booster light sources 20 may be arranged inside the circle, which is formed by the primary light sources 6.

In the embodiment depicted in FIG. 4, the booster light sources 20 are arranged along a circular arc, which is coaxial with the circle of the primary light sources 6. The circular arc extends over an angular range θ of 30° (+/−15°), which is centered around the forward flight direction F. In further embodiments, the circular arc may extend over larger angular ranges, for example over an angular range θ in the range of between 30° (+/−15°) and 60° (+/−30°) or over an angular range θ of between 60° (+/−30°) and 90° (+/−45°), centered around the forward flight direction F.

Figure 5:
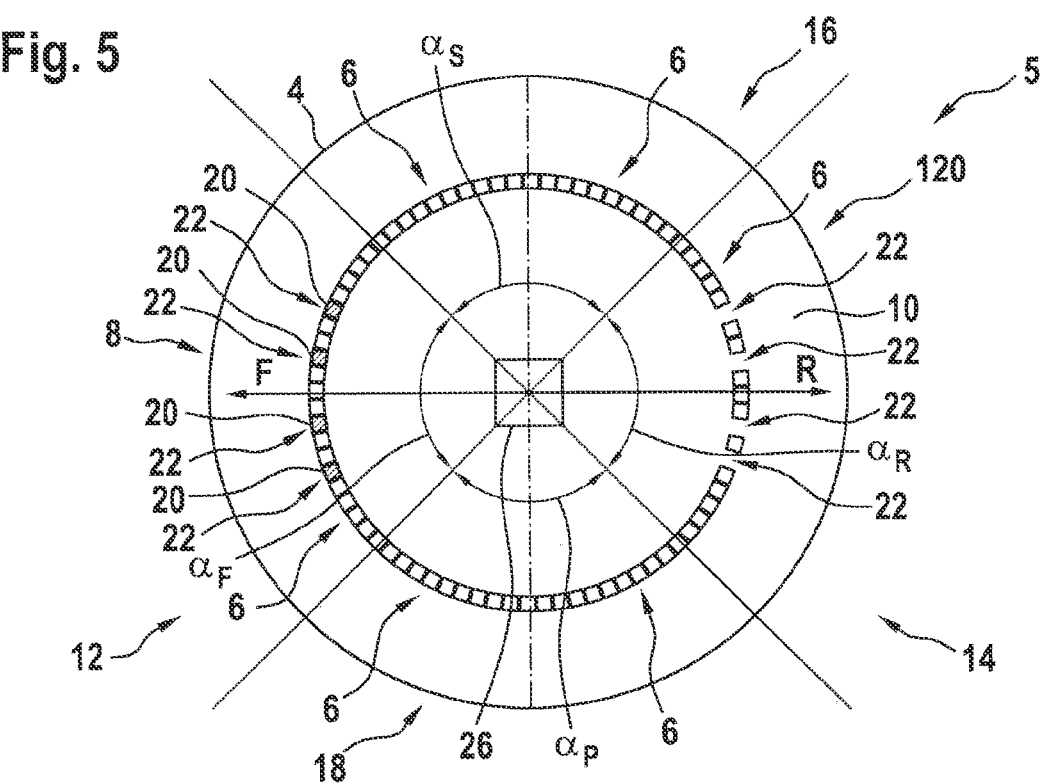
FIG. 5 shows a schematic top view of selected components of an aircraft beacon light according to another exemplary embodiment of the invention.

FIG. 5 depicts a schematic top view of selected components of a red-flashing beacon light 120 according to another exemplary embodiment of the invention.

Similar to the embodiment depicted in FIG. 4, the embodiment of a red-flashing beacon light 120 depicted in FIG. 5 comprises a light source support 10 and a plurality of primary light sources 6 that are arranged on the light source support 10 in a light source arrangement extending along a closed circle. The embodiment of FIG. 5 is highly similar to the embodiment of FIG. 4, and reference is made to the description of the embodiment of FIG. 4 above. The below discussion of FIG. 5 will mainly focus on the differences between the embodiments of FIG. 4 and FIG. 5.

As it has been described before, the angular range in the vertical plane that is to be covered by the forward sector 12 and the aft sector 14 may be smaller than the angular range in the vertical plane that is to be covered by the starboard lateral sector 16 and the portside lateral sector 18. Such a design may be based on the consideration that light, which is emitted into the forward sector 12 and the aft sector 14, is not blocked by the engines 180a, 180b or winglets of the aircraft 100.

In accordance with this approach, a smaller number of primary light sources 6 may be provided for illuminating the forward sector 12 and the aft sector 14 than for illuminating the starboard lateral sector 16 and the portside lateral sector 18, respectively. Due to the smaller number of primary light sources 6, gaps 22 may be present between the primary light sources 6, which are configured for illuminating the forward sector 12 and the aft sector 14, respectively.

In the embodiment depicted in FIG. 5, such gaps 22 are formed between some of the primary light sources 6 that are arranged for illuminating the forward sector 12 and the aft sector 14, respectively. In an embodiment, in which gaps 22 are formed between at least some of the primary light sources 6, the booster light sources 20 may be arranged within at least some of these gaps 22, as it is shown in FIG. 5. As a result, all light sources 6, 20, i.e. the primary light sources 6 as well as the booster light sources 20, may be arranged in the same light source arrangement, which extends along a closed contour, such as the circle shown in FIG. 5.

Arranging the booster light sources 20 in the gaps 22 that are formed between at least some of the primary light sources 6 may allow for a very efficient and compact arrangement of the booster light sources 20 among the primary light sources 6. When the booster light sources 20 are arranged in the gaps 22, no additional space is needed for arranging the booster light sources 20 in the light emission portion 5 of the aircraft beacon light 120.

In the embodiments depicted in FIGS. 4 and 5, the light sources 6, 20 are arranged along a circle or a circular arc. Such arrangements of the light sources 6, 20 are, however, only exemplary. In further embodiments, which are not explicitly shown in the figures, the light sources 6, 20 may be arranged in other geometric configurations. The geometric configuration may, for example, include polygonal configurations, such as triangles, rectangles, hexagons and octagons.

Generally speaking, the primary light sources 6 may be arranged in a light source arrangement that extends along a closed contour, and the booster light sources 20 may be integrated into said light source arrangement along said closed contour, as it is depicted for an exemplary circular configuration in FIG. 5.

In an alternative embodiment, the booster light sources 20 may be arranged separately from, for example outside or inside of, the arrangement of primary light sources 6, as it is exemplarily depicted in FIG. 4.

FIG. 6 depicts a functional block diagram of an aircraft beacon light 120 and a controller 30 for controlling the operation of the aircraft beacon light 120 according to an exemplary embodiment of the invention.

The aircraft beacon light 120, which is schematically shown on the right side of FIG. 6, comprises a plurality of primary light sources 6 and a plurality of booster light sources 20. The primary light sources 6 and the booster light sources 20 are electrically connected in series. In consequence, the same electric current j is flowing through all the light sources 6, 20, when the primary light sources 6 and the booster light sources 20 are activated.

The aircraft beacon light 120 further comprises an electric bypass circuit 28 with an electric bypass switch 29. The electric bypass circuit 28 provides a current path in parallel to the at least one booster light source 20. The electric bypass circuit 28 and the electric bypass switch 29 allow for selectively bypassing the booster light sources 20 by switching the electric bypass switch 29.

When the electric bypass switch 29 is closed, the electric current j, which is flowing through the primary light sources 6, bypasses the booster light sources 20 via the electric bypass circuit 28, so that no electric current is flowing through the booster light sources 20. In consequence, the booster light sources 20 are deactivated, when the electric bypass switch 29 is switched on/closed.

For activating the booster light sources 20, the electric bypass switch 29 is opened/switched off. This deactivates the electric bypass circuit 28, so that the electric current j, which is flowing through the primary light sources 6, flows through the booster light sources 20 as well.

The configuration depicted in FIG. 6, in which the light sources 6, 20 are electrically connected in series and the booster light sources 20 may be selectively activated and deactivated by switching the bypass switch 29, allows for operating the light sources 6, 20 with an electric power supply 32 that is configured for supplying a constant electric current j to the light sources 6, 20, i.e. an electric current j that is independent of the number of serially connected light sources 6, 20.

The exemplary embodiment of the aircraft beacon light 120 depicted in FIG. 6 further comprises a light sensor 24. The light sensor 24 allows for monitoring the operation of the light sources 6, 20. The aircraft beacon light 120 also comprises an erosion detector 26 that is configured for monitoring the light transmissive cover 4 for detecting erosion of said light transmissive cover 4, in particular erosion of the forward facing front side 8 of the light transmissive cover 4.

The controller 30 comprises the electric power supply 32 and a control circuit 34, which is configured for receiving the signals provided by the light sensor 24 and the erosion detector 26. The controller 30 is further configured for controlling the electric power supply 32 and the electric bypass switch 29, based on the signals received from the light sensor 24 and the erosion detector 26.

The control circuit 34 may be configured for adjusting the electric current j flowing through the light sources 6, 20, so that the light sources 6, 20 emit light generating a predefined effective luminous intensity Ieff. The control circuit 34 may in particular be configured for increasing the electric current j that flows through the light sources 6, 20 in order to compensate for a reduction of the intensity of the light that is emitted by the light sources 6, 20 due to aging of the light sources 6, 20. Such a reduction of the intensity of the light that is emitted by the light sources 6, 20 may be detected by the light sensor 24.

The control circuit 34 may further be configured for deactivating the electric bypass circuit 28 by switching off/opening the electric bypass switch 29, in order to activate the booster light sources 20, when the erosion of the light transmissive cover 4, in particular the erosion of the forward facing front side 8 of the light transmissive cover 4, has reached or exceeded a predefined erosion threshold. The erosion of the light transmissive cover 4 may be detected by the erosion sensor 26. It is also possible that the erosion of the light transmissive cover 4 may be detected by manual inspection, such as during a flight preparation procedure, and the opening of the electric bypass switch 29 may be ordered manually.

The controller 30 may be supplied with electric energy from an aircraft power supply system 40. The aircraft beacon light 120 may be activated and deactivated by selectively activating and deactivating the supply of electric energy from the aircraft power supply system 40. Alternatively, the control circuit 34 may comprise a control input terminal 38, which allows for activating and deactivating the aircraft beacon light 120 by providing an input to the control circuit 34 via the control input terminal 38. The control input terminal 38 may also be used for communicating opening/closing commands regarding the electric bypass switch 29.

FIG. 7 depicts a diagram showing a plurality of distributions of the effective luminous intensity Ieff provided by an aircraft beacon light 120 according to an exemplary embodiment of the invention.

In particular, the diagram shows a plurality of distributions of the effective luminous intensity Ieff in a horizontal plane ($\beta'=0°$), as a function of the angle $\theta'$ with respect to the forward flight direction F. In the diagram depicted in FIG. 7, an angle $\theta'$ of 0° corresponds to the forward flight direction F, an angle $\theta'$ of +90° corresponds to the portside direction, an angle $\theta'$ of +/−180° corresponds to the rearward direction, and an angle $\theta'$ of −90° corresponds to the starboard direction.

The horizontal dashed-dotted line 42, which is plotted at an effective luminous intensity Ieff of 400 cd (100%), represents the minimum requirement of the effective luminous intensity Imin according to the FAR standard.

The solid line 44 illustrates the effective luminous intensity Ieff of the light that is emitted by an aircraft beacon light 120 according to an exemplary embodiment of the invention with a non-eroded light transmissive cover 4 in a normal operation mode, i.e. in a mode of operation, in which the primary light sources 6 are activated and in which the booster light sources 20 are deactivated.

The solid line 44 shows that the effective luminous intensity Ieff provided by an aircraft beacon light 120 with a non-eroded light transmissive cover 4 is in all spatial directions, i.e. for all angles $\theta'$, well above the minimum effective luminous intensity Imin of 400 cd, as required by the FAR standard.

The dotted line 46 illustrates the effective luminous intensity Ieff of the light provided by an aircraft beacon light 120 according to an exemplary embodiment of the invention with a considerably eroded light transmissive cover 4, when operated in the normal operation mode, i.e. in the mode of operation, in which the primary light sources 6 are activated and in which the booster light sources 20 are deactivated As discussed before, in particular the front side 8 of the light transmissive cover 4, which is exposed to impinging streams of ambient air, is eroded. In consequence, the effective luminous intensity Ieff provided by the aircraft beacon light 120 is reduced significantly around the forward flight direction F. In the depicted example, in a spatial sector that extends between $\theta'=-60°$ and $\theta'=60°$ in the horizontal plane, the effective luminous intensity I is below the FAR minimum requirement Imin of 400 cd. In consequence, an aircraft beacon light 120 with such an eroded light transmissive cover 4 may no longer be considered airworthy in an aircraft 100.

The dashed line 48 illustrates the effective luminous intensity Ieff of the light that is emitted by an aircraft beacon light 120 according to an exemplary embodiment of the invention, wherein the aircraft beacon light 120 comprises an eroded light transmissive cover 4 and is operated in a booster operation mode, i.e. in a mode of operation, in which the booster light sources 20 are activated in addition to the primary light sources 6.

The dashed line 48 shows that the effective luminous intensity Ieff of the light emitted by the aircraft beacon light 120 is increased ("boosted"), in particular in the forward sector, more particular in a spatial sector, which extends in the horizontal plane between θ'=−90° and θ'=90° with respect to the forward flight direction F. In consequence, the effective luminous intensity Ieff is above the FAR minimum requirement Imin of 400 cd over the whole angular range, in particular including the spatial sector between θ'=−60° and θ'=60°, in which the effective luminous intensity Ieff is below the FAR minimum requirement Imin of 400 cd in the depicted example, when the booster light sources 20 are not activated, as illustrated by the dotted line 46.

As a result, the aircraft beacon light 120 according to an exemplary embodiment of the invention, in which the booster light sources 20 are activated, fulfills the FAR requirements despite the presence of erosion of the light transmissive cover 4. In consequence, the aircraft beacon light 120 may still be considered airworthy in an aircraft 100 despite the presence of substantial erosion of the light transmissive cover 4, when the at least one booster light source 20 is activated in addition to the plurality of primary light sources 6.

For comparison, the effective luminous intensity Ieff provided by the aircraft beacon light 120 with a non-eroded light transmissive cover 4, in which the at least one booster light source 20 is activated in addition to the plurality of primary light sources 6, is illustrated by the dashed-dotted line 50.

For keeping the power consumption of the aircraft beacon light 120 low, the booster light sources 20 are usually not activated when the light transmissive cover 4 is in a non-eroded state, in which it is not necessary to boost the light emission that is emitted by the primary light sources 6 of the aircraft beacon light 120 in order to fulfill the FAR requirements.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft beacon light, comprising:
   a plurality of primary light sources for emitting light into at least two spatial sectors, wherein the at least two spatial sectors include a forward sector and at least one of an aft sector, a starboard lateral sector, and a portside lateral sector; and
   a light transmissive cover, which covers the plurality of primary light sources;
   wherein the plurality of primary light sources are arranged and configured for providing an FAR-compliant aircraft beacon light output of the aircraft beacon light, in case of the light transmissive cover being in a non-eroded state;
   wherein the aircraft beacon light further comprises:
   at least one booster light source for selectively emitting a booster light output predominantly into the forward sector, in case of the light transmissive cover being in an eroded state, wherein the at least one booster light source is controllable independently of the plurality of primary light sources.

2. An aircraft beacon light according to claim 1, wherein the at least one booster light source comprises a plurality of booster light sources, which are controllable independently of the primary light sources, wherein the plurality of booster light sources are in particular jointly switchable.

3. An aircraft beacon light according to claim 1, wherein the plurality of primary light sources have a light source arrangement along a closed contour and wherein the at least one booster light source is integrated into said light source arrangement along the closed contour, wherein the at least one booster light source is in particular arranged in at least one gap that is formed between at least some of the plurality of primary light sources.

4. An aircraft beacon light according to claim 3, wherein the closed contour is a circle or an ellipse or a polygon, such as a rectangle, in particular a square, or a hexagon, or an octagon.

5. An aircraft beacon light according to claim 1, wherein the plurality of primary light sources have a light source arrangement along a closed contour and wherein the at least one booster light source is arranged separately from said light source arrangement along the closed contour.

6. An aircraft beacon light according to claim 5, wherein the closed contour is a circle or an ellipse or a polygon, such as a rectangle, in particular a square, or a hexagon, or an octagon.

7. An aircraft beacon light according to claim 1, wherein the closed contour is a circle or an ellipse or a polygon, such as a rectangle, in particular a square, or a hexagon, or an octagon;
   wherein a spatial density of the primary light sources that are arranged for emitting light into the forward sector is smaller than a spatial density of the primary light sources that are arranged for emitting light into the starboard lateral sector and into the portside lateral sector.

8. An aircraft beacon light according to claim 1, wherein a vertical opening angle (β) of the aircraft beacon light output in the forward sector is smaller than a vertical opening angle (β) of the aircraft beacon light output in the starboard lateral sector and the portside lateral sector.

9. An aircraft beacon light according to claim 1, wherein the plurality of primary light sources and the at least one booster light source are electrically connected in series.

10. An aircraft beacon light according to claim 1, wherein the aircraft beacon light comprises a switchable electric bypass circuit, which allows for selectively deactivating the at least one booster light source by electrically bypassing the at least one booster light source.

11. An aircraft beacon light according to claim 1,
   wherein the plurality of primary light sources are a plurality of primary LEDs, in particular a plurality of primary LEDs that emit red light; and wherein the at least one booster light source is at least one booster LED, in particular at least one booster LED that emits red light.

12. An aircraft beacon light according to claim 1, further comprising:
   an erosion detector for determining a state of erosion of the light transmissive cover, in particular for determining a state of erosion of a forward facing portion of the light transmissive cover; and
   a controller, which is configured for activating and deactivating the at least one booster light source depending on the state of erosion of the light transmissive cover.

13. An aircraft beacon light according to claim 1, wherein the forward sector extends over a horizontal angular range of at least 60°, which is centered around a forward flight direction (F), which is centered around the forward flight direction (F).

14. An aircraft comprising:
   a plurality of aircraft beacon lights according to claim 1, wherein the plurality of aircraft beacon light includes:
   an upper aircraft beacon light mounted to a top portion of a fuselage of the aircraft or to a vertical stabilizer of the aircraft; and
   a lower aircraft beacon light mounted to a bottom portion of the fuselage of the aircraft.

15. A method of operating an aircraft beacon light, which comprises a plurality of primary light sources, at least one booster light source, and a light transmissive cover, which covers the plurality of primary light sources, the method comprising:
   with the plurality of primary light sources, emitting an aircraft beacon light output, which is FAR-compliant in case of the light transmissive cover being in a non-eroded state, into at least two spatial sectors, wherein the at least two spatial sectors include a forward sector and at least one of an aft sector, a starboard lateral sector, and a portside lateral sector;
   with the at least one booster light source, selectively emitting a booster light output predominantly into the forward sector on the basis of a state of erosion of the light transmissive cover;
   wherein a switching of the at least one booster light source is independent of a switching of the plurality of primary light sources, and
   wherein said switching of the at least one booster light source in particular includes selectively bypassing the at least one booster light source with a switchable electric bypass circuit.

16. Method of claim 15, wherein the method further includes:
   detecting the state of erosion of the light transmissive cover, in particular detecting a state of erosion of a forward facing portion of the light transmissive cover, with an erosion detector; and
   depending on the state of erosion of the light transmissive cover, as detected with the erosion detector, selectively emitting the booster light output into the forward sector with the at least one booster light source.

* * * * *